(12) United States Patent
Huang et al.

(10) Patent No.: US 9,170,827 B2
(45) Date of Patent: Oct. 27, 2015

(54) CONFIGURATION FILE COMPATIBILITY

(75) Inventors: Freeman Yufei Huang, Roseville, CA (US); Mehrotra Anurag, Uttar Pradesh (IN); Nair Anoop, Kerala (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 551 days.

(21) Appl. No.: 13/362,159

(22) Filed: Jan. 31, 2012

(65) Prior Publication Data
US 2013/0198716 A1    Aug. 1, 2013

(51) Int. Cl.
*G06F 9/44* (2006.01)
*G06F 9/445* (2006.01)

(52) U.S. Cl.
CPC ............. *G06F 9/44505* (2013.01); *G06F 8/36* (2013.01); *G06F 8/65* (2013.01)

(58) Field of Classification Search
CPC ......... G06F 8/65; G06F 9/44505; G06F 8/36; G06F 8/60; G06F 8/61; G06F 8/71; G06F 11/0763
See application file for complete search history.

(56) References Cited

U.S. PATENT DOCUMENTS

| | | | |
|---|---|---|---|
| 5,915,112 A * | 6/1999 | Boutcher | 719/330 |
| 7,305,547 B2 | 12/2007 | Musa | |
| 7,328,434 B2 | 2/2008 | Swanson et al. | |
| 7,415,603 B2 * | 8/2008 | Woundy et al. | 713/1 |
| 7,757,224 B2 | 7/2010 | Forin et al. | |
| 2002/0124243 A1 * | 9/2002 | Broeksteeg et al. | 717/168 |
| 2006/0041881 A1 * | 2/2006 | Adkasthala | 717/168 |
| 2007/0288914 A1 * | 12/2007 | Brannock et al. | 717/169 |
| 2009/0086259 A1 | 4/2009 | Bailey et al. | |
| 2010/0169709 A1 * | 7/2010 | Chiu et al. | 714/16 |
| 2010/0306757 A1 | 12/2010 | Becker et al. | |
| 2011/0307878 A1 * | 12/2011 | Brannock et al. | 717/169 |
| 2012/0210166 A1 * | 8/2012 | Bonefas et al. | 714/18 |

OTHER PUBLICATIONS

Reidar Conradi, Version models for software configuration management; 1998 ACM; pp. 232-282; <http://dl.acm.org/citation.cfm?id=280280>.*

Jacky Estublier; Software configuration management a roadmap; 2000 ACM; pp. 279-289; <http://dl.acm.org/citation.cfm?id=336576>.*

Jacky Estublier et al.; Impact of software engineering research on the practice of software configuration management; 2005 ACM; pp. 383-430; <http://dl.acm.org/citation.cfm?id=1101817>.*

K. Narayanaswamy et al.; Maintaining Configurations of Evolving Software Systems; 1987 IEEE; pp. 324-334; <http://ieeexplore.ieee.org/stamp/stamp.jsp?tp=&arnumber=1702218>.*

Reidar Conradi et al.; Configuring Versioned Software Products; 1996 Springer; pp. 88-109; <http://link.springer.com/chapter/10.1007/BFb0023083>.*

(Continued)

*Primary Examiner* — Thuy Dao
*Assistant Examiner* — Cuong V Luu
(74) *Attorney, Agent, or Firm* — Hewlett-Packard Patent Department

(57) ABSTRACT

Disclosed herein is a technique that compares a first series of bits associated with a configuration file with a second series of bits associated with computer readable instructions so as to determine whether the configuration file is compatible with the instructions.

25 Claims, 2 Drawing Sheets

(56) References Cited

OTHER PUBLICATIONS

Marko Rosenmuller et al.; Automating the Configuration of Multi Software Product Lines; 2010 VaMos; 8 pages; <http://wwwiti.cs.uni-magdeburg.de/iti_db/publikationen/ps/auto/RS10.pdf>.*

Automatic Backward Compatibility Analysis of Software Component Binary Interfaces, Ponomarenko, A. et al., 2011 IEEE, Jun. 10-12, 2011, On pp. 167-173; vol. 3.

* cited by examiner

CONFIGURATION FILE COMPATIBILITY

BACKGROUND

Configuration files may be used to influence the execution of computer readable instructions. This allows a user to affect the execution of executable instructions by simply editing relevant entries in the configuration file. Without such configuration files, the source code of the computer readable instructions would need to be updated and recompiled, which may take a considerable amount of time. Often, only few people have access to the source code. Therefore, computer readable instructions may contain commands that search for certain entries contained in the configuration file. Such entries may govern certain functions of the program. For example, an entry in the configuration file may be "DATABASE=C:/system/database." This may instruct a program to retrieve records from a database located in a folder "C:/system/database." The computer readable instructions may contain commands therein that searches specifically for the variable "DATABASE." The instructions may then detect the value associated with the variable "DATABASE" and search for a database located in the folder "C:/system/database."

As new versions of the program develop, a new version may be configured to search for entries that are different than those they were configured for previously. For example, an older version of the program may have been configured to search for the entry containing the variable "DATABASE," but a newer version of the program may be configured to search for the entry containing the variable "DATABASE_LOCATION" in lieu of "DATABASE." A configuration file containing the older variable may be deemed incompatible with the new version of the program. Configuration files may include a version number associated with a particular release of a program to indicate the version with which the configuration file is compatible. If the version number detected in the configuration file is different than the version associated with a new release, the new version may contain modules therein that alter the entries so as to make the configuration file compatible therewith. Once the configuration file is updated, the program may proceed without encountering incompatible configuration file entries.

DETAILED DESCRIPTION

As noted above, the detection of an older version number in the configuration file may trigger modules within the new version of the program to upgrade incompatible entries therein. However, there may be various branches of program development that may proceed in parallel. For example, one branch of development may address bugs detected in the program while a second branch may address specific user requirements. It may be difficult to determine the order of the version numbers associated with such parallel versions. Without a concrete order of versions, determining the changes needed in the configuration file may be burdensome and disorderly.

In view of the foregoing, aspects of the present disclosure provide techniques for comparing a first series of bits associated with the configuration file with a second series of bits associated with computer readable instructions so as to determine whether the configuration file is compatible with the instructions. In another aspect of the present disclosure, if it is determined that the first series of bits is different than the second series of bits, each active bit in the second series of bits, whose corresponding bit in the first series of bits is inactive, may be associated with a module. Each module may convert each entry in the configuration file so as to make the configuration file compatible with the instructions. The aspects, features and advantages of the application will be appreciated when considered with reference to the following description of examples and accompanying figures. The following description does not limit the application; rather, the scope of the application is defined by the appended claims and equivalents.

Figure 1:
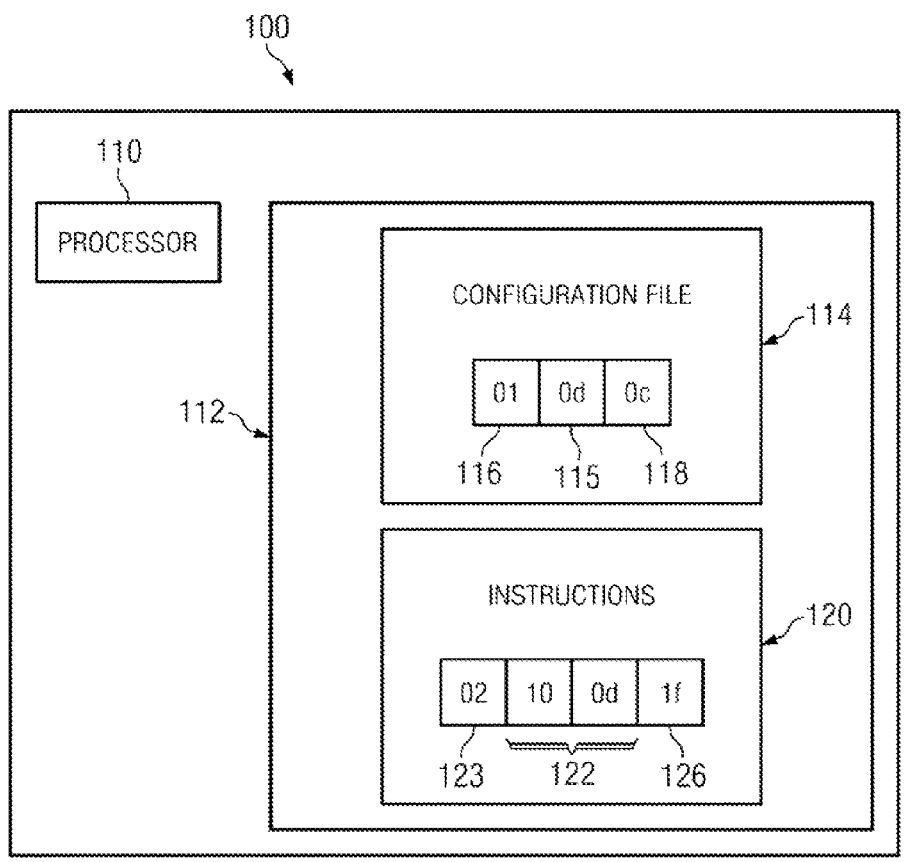
FIG. 1 is an example of a computer apparatus in accordance with aspects of the disclosure.

FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. The computer apparatus 100 may also contain a processor 110 and memory 112. Memory 112 may store instructions that may be retrieved and executed by processor 110. In one example, memory 112 may be a random access memory ("RAM") device. In a further example, memory 112 may be divided into multiple memory segments organized as dual in-line memory modules (DIMMs). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Although all the components of computer apparatus 100 are functionally illustrated in FIG. 1 as being within the same block, it will be understood that the components may or may not be stored within the same physical housing. Furthermore, computer apparatus 100 may actually comprise multiple processors and memories working in tandem.

Configuration file 114 may be a flat file containing at least one entry. Each entry of the configuration file may comprise a variable and a value associated with the variable. The values may affect the execution of instructions 120. If instructions 120 execute an operating system, the entries of configuration file 114 may be environment variables whose associated values govern certain functions of the operating system. Configuration file 114 may also be a registry, such as the Windows registry for Microsoft® Windows operating systems. Such a registry may comprise a hierarchical database of variables and their associated values. A user or administrator may be capable of changing the value associated with a variable in order to adjust the real-time execution of instructions 120.

The instructions 120 residing in memory 112 may comprise any set of computer readable instructions to be executed directly (such as machine code) or indirectly (such as scripts) by the processor(s). In that regard, the terms "instructions," "modules" and "programs" may be used interchangeably herein. The instructions may be stored in any computer language or format, such as in object code or modules of source code. In one example, the instructions may be realized in any non-transitory computer-readable media for use by or in connection with an instruction execution system such as computer apparatus 100, an ASIC, or other system that can fetch or obtain the logic from non-transitory computer-readable media and execute the instructions contained therein. "Non-transitory computer-readable media" may be any media that may contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Configuration file 114 is shown having a first series of bits 115 stored therein. Furthermore, instructions 120 is shown having a second series of bits 122 hardcoded therein. However, it is understood that the first series of bits 115 and the second series of bits 122 may be stored in any location and that FIG. 1 is merely illustrative. Such a location may be an address of a memory or storage. First series of bits 115 and second series of bits 122 is shown in hexadecimal format. The first series of bits 115 and the second series of bits 122 may each be associated with a value representing a number of bytes therein that contains at least one active bit. For example, byte 116 may contain a value associated with the first series of bits 115. FIG. 1 depicts byte 116 having a value of one, which may notify processor 110 that one byte of the first series of bits 115 contains at least one active bit. Byte 123 may contain a value associated with the second series of bits 122. FIG. 1 depicts byte 123 having a value of two, which may notify processor 110 that two bytes of the second series of bits 122 contain at least one active bit. The first series of bits 115 and the second series of bits 122 may each be associated with a check sum for detecting errors therein. Byte 118 may be a checksum that may be used for detecting errors in the first series of bits 115. Similarly, byte 126 of FIG. 1 may be a checksum that may be used to detect errors in the second series of bits 122. As will be discussed in more detail below, the first series of bits 115 may be compared to the second series of bits 122 to determine how to convert configuration file 114 so as to make configuration file 114 compatible with instructions 120.

Figure 2:
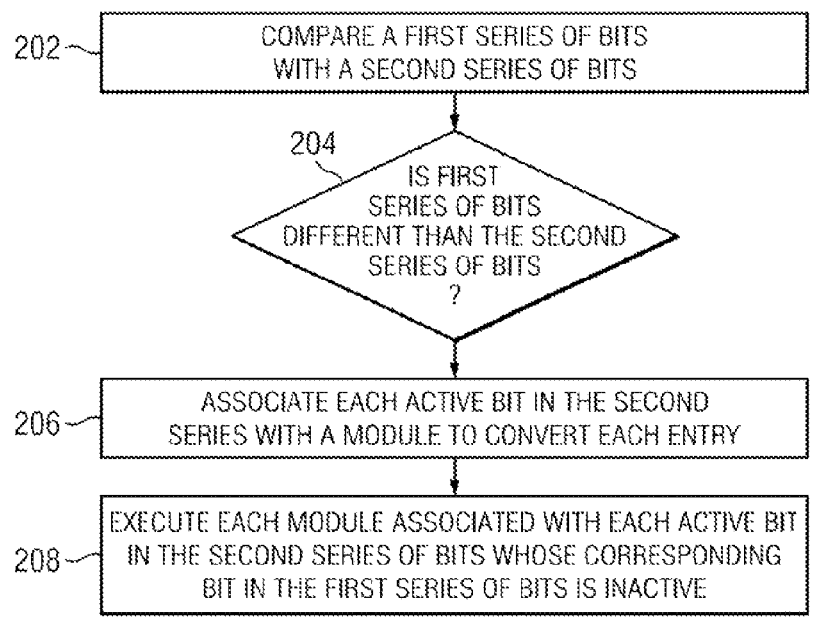
FIG. 2 is a flow diagram in accordance with aspects of the disclosure.
Figure 3:
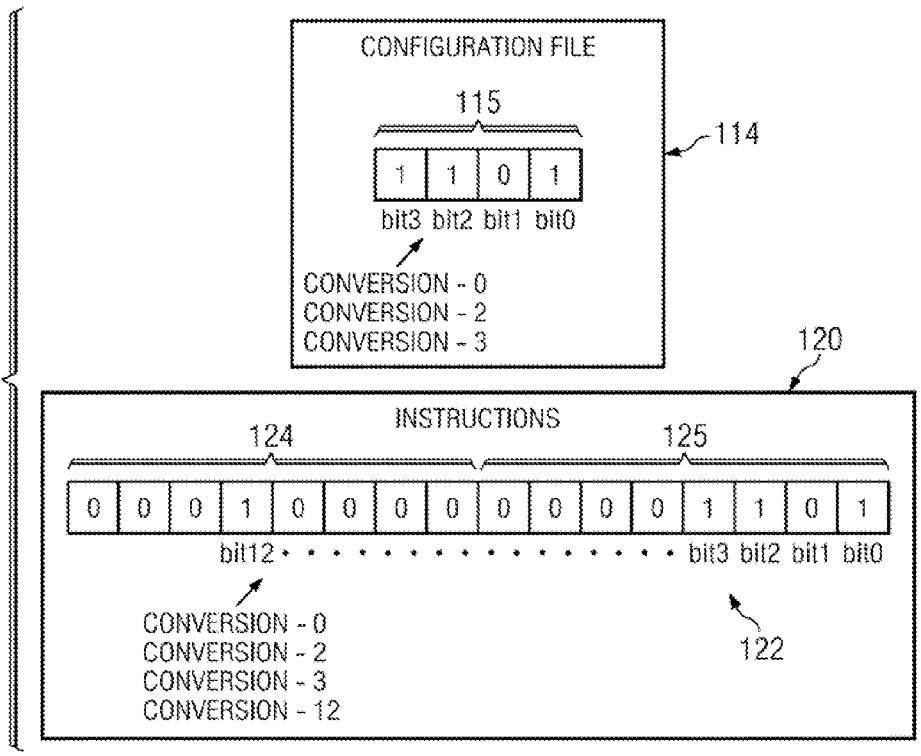
FIG. 3 is a working example of compatibility management in accordance with aspects of the disclosure.
Figure 4:
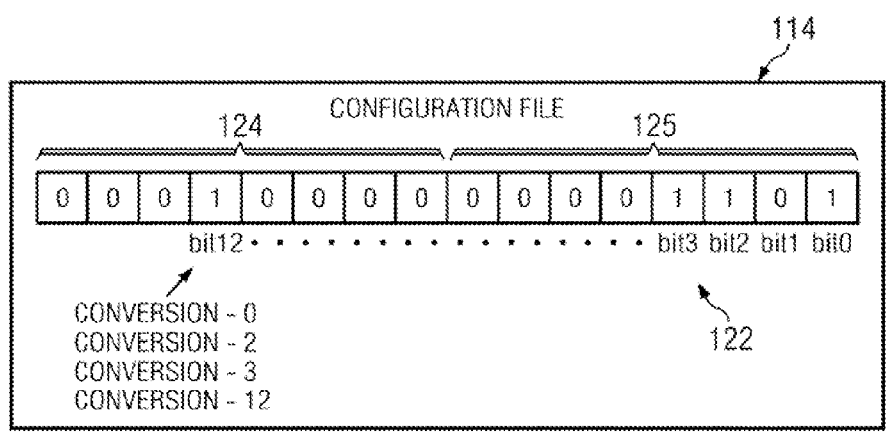
FIG. 4 is a further working example of compatibility management in accordance with aspects of the disclosure.

One working example of the apparatus and method is shown in FIGS. 2-4. In particular, FIG. 2 shows a flow diagram of an illustrative process for making a configuration file compatible with computer readable instructions. FIGS. 3-4 show various aspects of managing compatibility in accordance with aspects of the present disclosure. The actions shown in FIGS. 3-4 will be discussed below with regard to the flow diagram of FIG. 2.

As shown in block 202 of FIG. 2, a first series of bits associated with the configuration file may be compared with a second series of bits associated with the instructions so as to determine whether the: configuration file is compatible with the instructions. Referring to FIG. 3, a close up illustrtion of the first series of bits 115 is shown. As noted above, the first series of bits 115 may be associated with configuration file 114. FIG. 3 also shows a close up illustration of the second series of bits 122. The second series of bits 122 may be divided into two bytes, bytes 124-125. In this example, the bits may be read from right to left, but it is understood that the bits may also be read from left to right. Furthermore, in the example of FIG. 3, a byte is equal to eights bits. In the first series of bits 115, bit zero, bit two, and bit three are activated. An active bit in this example is any bit set to one, however, it is understood that other examples may consider a zero bit to be active. In the second series of bits 122, bit zero, bit two, bit three, and bit twelve are activated.

Referring back to FIG. 2, it is determined whether the first series of bits is different than the second series of bits, as shown in block 204. In the second series of bits 122 shown in FIG. 3, bit twelve is shown to be activated. However, no such bit is active in the first series of bits 115. In the first series of bits 115, bit three is the highest active bit. This difference may indicate that configuration file 114 is not compatible with instructions 120. Referring back to FIG. 2, each active bit in the second series of bits, whose corresponding bit in the first series of bits is inactive, may be associated with a module, as shown in block 206. In the example of FIG. 3, bit twelve is the only active bit in the second series of bits 122 whose corresponding bit in the first series of bits 115 is inactive. Bit twelve of the second series of bits 122 may be associated with a module containing instructions therein to convert a configuration entry that is associated with bit twelve in the second series of bits 122, since bit twelve is the only bit in the second series of bits 122 that is different than its corresponding bit in the first series of bits 115. As noted above, each entry of the configuration file may comprise a variable and a value associated with the variable. The module may alter the variable or the value included in the entry so as to enable instructions 120 to read and process the entry.

Referring back to FIG. 3, the activation of bits zero, two, and three in the first series of bits 115 may indicate that a conversion module associated with each bit has already been executed (e.g., conversion_0, conversion_2, and conversion_3). That is, the entries associated with bits zero, two, and three have already been upgraded by a corresponding module. However, in view of the difference between the series of bits, it may be determined that the module corresponding to bit twelve in the second series of bits 122 has not been executed. Bit twelve of the second series of bits 122 may be mapped or associated with a module enabled to convert an entry in the configuration file associated with bit twelve. Such conversion may enable instructions 120 to detect the entry in the configuration file. Referring back to FIG. 2, each module associated with each active bit in the second series of bits, whose corresponding bit in the first series of bits is inactive, may be executed, as shown in block 208. In FIG. 3, since bit twelve of the second series of bits 122 is different than bit twelve in the first series of bits 115, the illustrative module conversion_12 may be executed. The illustrative module called conversion_12 may alter the variable or the value included in the entry associated with bit twelve so as to enable instructions 120 to read that entry. In one example, each conversion module may be a subroutine in instructions 120.

In a further example, the first series of bits may be replaced by the second series of bits so as to associate the second series of bits with the configuration file. FIG. 4 shows configuration file 114 associated with the second series of bits, which has bits zero, one, two, three, and twelve activated. Thus, when a newer version of instructions 120 attempts to read configuration file 114, the new version may recognize the conversions that have taken place by detecting the active bits in the new series of bits.

Advantageously, the above-described system and method maintains the compatibility of configuration files with parallel versions of programs that do not have a definite version order. In this regard, users may experience less difficulty when receiving a new program version and developers can easily maintain the different parallel versions of the program.

Although the disclosure herein has been described with reference to particular examples, it is to be understood that these examples are merely illustrative of the principles of the disclosure. It is therefore to be understood that numerous modifications may be made to the example's and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently and steps may be omitted or added.

The invention claimed is:

1. A method comprising:
comparing, using at least one processor, a first series of bits associated with a configuration file with a second series of bits associated with a set of computer readable instructions so as to determine whether the configuration file is compatible with the instructions;
in response to determining that the configuration file is not compatible with the instructions, associating, using the at least one processor, each active bit in the second series of bits, whose corresponding bit in the first series of bits is inactive, with a module, the module converting a respective entry in the configuration file so as to ensure that the at least one processor is able to parse the respective entry in accordance with the instructions; and
executing each module associated with each active bit in the second series of bits whose corresponding bit in the first series of bits is inactive, the executed each module to convert the respective entry in the configuration file.

2. The method of claim 1, wherein the respective entry converted by the executed each module is associated with an active bit in the second series of bits whose corresponding bit in the first series of bits is inactive.

3. The method of claim 1, wherein the module, if executed, further causes the at least one processor to replace the first series of bits with the second series of bits so as to associate the second series of bits with the configuration file.

4. The method of claim 1, wherein the first series of bits and the second series of bits are each associated with a value representing a number of bytes therein that contains at least one active bit.

5. The method of claim 1, wherein the first series of bits and the second series of bits are each associated with a checksum for detecting errors therein.

6. The method of claim 1, wherein the module is a subroutine contained in the instructions.

7. The method of claim 1, wherein the associating associates each active bit in the second series of bits, whose corresponding bit in the first series of bits is inactive, with a respective module of a plurality of modules, and wherein the executing executes the plurality of modules to convert respective entries in the configuration file.

8. The method of claim 7, wherein each of the entries in the configuration file includes a variable with an associated value that governs a function of the instructions.

9. A non-transitory computer readable medium storing instructions which, upon execution, cause at least one processor to:
compare a first series of bits associated with a configuration file with a second series of bits associated with the instructions so as to determine whether the configuration file is compatible with the instructions;
in response to determining that the configuration file is not compatible with the instructions, associate each bit in the second series of bits, that is different than a corresponding bit in the first series of bits, with a respective module of a plurality of modules, the respective module, if executed, causing the at least one processor to convert a respective entry in the configuration file associated with a bit in the second series of bits that is different than the corresponding bit in the first series of bits, so as to enable the at least one processor to detect the respective entry in the configuration file in accordance with the instructions; and
execute each of the plurality of modules associated with bits in the second series of bits that are different than the corresponding bits in the first series of bits, the executed plurality of modules converting respective entries in the configuration file.

10. The computer readable medium of claim 9, wherein the instructions, upon execution, further cause the at least one processor to replace the first series of bits with the second series of bits so as to associate the second series of bits with the configuration file.

11. The computer readable medium of claim 9, wherein the first series of bits and the second series of bits are each associated with a value representing a number of bytes therein that contains at least one active bit.

12. The computer readable medium of claim 9, wherein the first series of bits and the second series of bits are each associated with a checksum for detecting errors therein.

13. The computer readable medium of claim 9, wherein each of the plurality of modules includes a respective subroutine contained in the instructions.

14. The computer readable medium of claim 9, wherein each of the entries in the configuration file includes a variable with an associated value that governs a function of the instructions.

15. A system comprising:
at least one processor to:
compare a first series of bits associated with a configuration file with a second series of bits associated with instructions executable on the at least one processor so as to determine whether the configuration file is compatible with the instructions;
in response to determining that the first series of bits is different than the second series of bits, associate each active bit in the second series of bits, whose corresponding bit in the first series of bits is inactive, with a module which, if executed, causes the at least one processor to convert a respective entry in the configuration file so as to make the respective entry compatible with the instructions; and
execute each module associated with each active bit in the second series of bits whose corresponding bit in the first series of bits is inactive, the executed each module to convert the respective entry in the configuration file.

16. The system of claim 15, wherein each entry in the configuration file that is incompatible with the instructions is associated with a respective active bit in the second series of bits whose corresponding bit in the first series of bits is inactive.

17. The system of claim 15, wherein the at least one processor is to replace the first series of bits with the second series of bits so as to associate the second series of bits with the configuration file.

18. The system of claim 15, wherein the first series of bits and the second series of bits are each associated with a value representing a number of bytes therein that contains at least one active bit.

19. The system of claim 15, wherein the first series of bits and the second series of bits each are each associated with a checksum for detecting errors therein.

20. The system of claim 15, wherein each entry of the configuration file comprises a variable and a value associated with the variable.

21. The system of claim 20, wherein to convert a given entry in the configuration file so as to make the configuration file compatible with the instructions, the corresponding module, if executed, causes the at least one processor to alter the variable or the value included in the given entry so as to enable the at least one processor to read the given entry in accordance with the instructions.

22. The system of claim 15, wherein each module is a subroutine contained in the instructions.

23. The system of claim 15, wherein the associating associates each active bit in the second series of bits, whose corresponding bit in the first series of bits is inactive, with a respective module of a plurality of modules, and wherein the executing executes the plurality of modules to convert respective entries in the configuration file.

24. The system of claim 23, wherein each of the entries in the configuration file includes a variable with an associated value that governs a function of the instructions.

25. The system of claim 24, wherein the first series of bits is part of the configuration file, and the second series of bits is part of the instructions.

* * * * *